US012630205B2

(12) United States Patent
Barton

(10) Patent No.: US 12,630,205 B2
(45) Date of Patent: May 19, 2026

(54) TRANSPORTATION DEVICE FOR MODULAR UNITS

(71) Applicant: Milwaukee Electric Tool Corporation, Brookfield, WI (US)

(72) Inventor: George Barton, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 570 days.

(21) Appl. No.: 18/062,718

(22) Filed: Dec. 7, 2022

(65) Prior Publication Data

US 2023/0115200 A1 Apr. 13, 2023

Related U.S. Application Data

(63) Continuation of application No. PCT/US2022/077841, filed on Oct. 10, 2022.

(60) Provisional application No. 63/280,936, filed on Nov. 18, 2021, provisional application No. 63/254,792, filed on Oct. 12, 2021.

(51) Int. Cl.
*B62B 1/20* (2006.01)
*B62B 5/06* (2006.01)

(52) U.S. Cl.
CPC .............. *B62B 1/208* (2013.01); *B62B 5/067* (2013.01)

(58) Field of Classification Search
CPC ................................ B62B 1/208; B62B 5/067
See application file for complete search history.

(56) References Cited

U.S. PATENT DOCUMENTS

| | | | |
|---|---|---|---|
| 3,424,334 A | 1/1969 | Goltz | |
| 4,595,107 A | 6/1986 | Welsch | |
| 4,705,247 A | 11/1987 | Delmerico | |
| 4,763,799 A | 8/1988 | Cohn et al. | |
| 4,790,610 A | 12/1988 | Welch et al. | |
| 4,998,023 A | 3/1991 | Kitts | |
| 5,011,240 A | 4/1991 | Kelley et al. | |
| 5,016,948 A | 5/1991 | Welch et al. | |
| 5,308,012 A | 5/1994 | Fuller | |
| 5,566,961 A | 10/1996 | Snell et al. | |
| 5,634,649 A | 6/1997 | Breining et al. | |
| 5,765,842 A | 6/1998 | Phaneuf et al. | |

(Continued)

FOREIGN PATENT DOCUMENTS

| | | |
|---|---|---|
| DE | 202014103695 | 12/2014 |
| EP | 1724069 A2 | 11/2006 |

(Continued)

OTHER PUBLICATIONS

US 8,273,008 B2, 09/2012, Quirico et al. (withdrawn)

(Continued)

*Primary Examiner* — Bryan A Evans
(74) *Attorney, Agent, or Firm* — Reinhart Boerner Van Deuren s.c.

(57) ABSTRACT

A transportation device configured to detachably engage with units, such as modular units, is provided. The transportation device is configured to actuate between an open position and a closed position. In the open position the transportation device is configured to couple to and help move one or more units, such as modular units. In the closed position, the transportation device is configured to engage with units, such as modular units, for easier movement of the transportation device.

19 Claims, 9 Drawing Sheets

(56)         References Cited

U.S. PATENT DOCUMENTS

| | | | |
|---|---|---|---|
| 5,890,613 A | 4/1999 | Williams | |
| 5,915,723 A | 6/1999 | Austin | |
| 5,971,512 A | 10/1999 | Swan | |
| 6,065,189 A | 5/2000 | Trine | |
| 6,270,094 B1 | 8/2001 | Campbell | |
| 6,497,423 B1 | 12/2002 | Perelli et al. | |
| 6,572,123 B2 | 6/2003 | Calmeise et al. | |
| 6,739,605 B2 | 5/2004 | Calmeise et al. | |
| 6,758,482 B2 | 7/2004 | Stallbaumer | |
| 6,843,488 B1 | 1/2005 | Tseng | |
| 6,983,946 B2 | 1/2006 | Sullivan et al. | |
| D515,767 S | 2/2006 | Arceta | |
| D517,768 S | 3/2006 | Arceta | |
| D518,267 S | 3/2006 | Arceta | |
| 7,014,200 B2 | 3/2006 | Calmeise et al. | |
| 7,111,852 B2 | 9/2006 | Woods et al. | |
| 7,213,817 B2 | 5/2007 | Cheung | |
| 7,306,245 B1 | 12/2007 | Lowe | |
| 7,338,054 B2 | 3/2008 | Pint | |
| 7,398,978 B2 | 7/2008 | Cheung | |
| 7,594,668 B2 | 9/2009 | Arceta et al. | |
| 7,806,426 B2 | 10/2010 | Van Landingham, Jr. et al. | |
| 7,815,215 B1 | 10/2010 | Lowe | |
| 7,862,534 B2 | 1/2011 | Quirico et al. | |
| 7,954,830 B2 | 6/2011 | Begin et al. | |
| 8,070,181 B2 | 12/2011 | Forrest et al. | |
| 8,109,526 B2 | 2/2012 | Mason et al. | |
| 8,215,650 B2 | 7/2012 | Arceta et al. | |
| 8,282,111 B2 | 10/2012 | Hailston et al. | |
| 8,322,732 B2 | 12/2012 | McKay et al. | |
| 8,333,160 B2 | 12/2012 | Lin | |
| 8,424,883 B1 | 4/2013 | Ramos | |
| 8,505,960 B1 | 8/2013 | Shindelar et al. | |
| 8,695,996 B2 | 4/2014 | Janick et al. | |
| 8,708,352 B2 | 4/2014 | Quirico et al. | |
| 8,720,913 B2 | 5/2014 | Fallon et al. | |
| 8,740,010 B1 | 6/2014 | Page | |
| 8,814,199 B2 | 8/2014 | Shindelar et al. | |
| 8,864,149 B2 | 10/2014 | Stryker et al. | |
| 8,894,076 B2 | 11/2014 | Hailston et al. | |
| 8,944,444 B1 | 2/2015 | Tvrdy | |
| 8,967,632 B1 | 3/2015 | Gunsaullus | |
| 9,114,203 B2 | 8/2015 | Quirico et al. | |
| 9,123,449 B2 | 9/2015 | Quirico et al. | |
| 9,216,753 B2 | 12/2015 | Bryan et al. | |
| 9,242,664 B2 | 1/2016 | Arceta et al. | |
| 9,254,856 B2 | 2/2016 | Oachs | |
| 9,266,547 B2 | 2/2016 | Schumaker et al. | |
| 9,272,722 B2 | 3/2016 | Dufoure et al. | |
| 9,283,975 B2 | 3/2016 | McClanahan et al. | |
| 9,299,467 B2 | 3/2016 | Hidem et al. | |
| 9,299,468 B2 | 3/2016 | Hidem et al. | |
| 9,375,835 B1 | 6/2016 | Lin | |
| 9,446,509 B2 | 9/2016 | Martin | |
| 9,452,768 B2 | 9/2016 | Fodrocy et al. | |
| 9,457,828 B1 | 10/2016 | Guirlinger | |
| 9,493,177 B1 | 11/2016 | Huang et al. | |
| 9,527,205 B1 | 12/2016 | Lin | |
| 9,597,053 B2 | 3/2017 | Hidem et al. | |
| 9,607,722 B2 | 3/2017 | Hidem et al. | |
| 9,616,562 B2 | 4/2017 | Hoppe et al. | |
| 9,623,887 B1 | 4/2017 | Brassard et al. | |
| 9,655,307 B2 | 5/2017 | Burmann | |
| 9,675,984 B1 | 6/2017 | Sotelo | |
| 9,717,844 B2 | 8/2017 | Quirico et al. | |
| 9,750,869 B2 | 9/2017 | Hidem et al. | |
| 9,750,870 B2 | 9/2017 | Hidem et al. | |
| 9,751,549 B2 | 9/2017 | McClanahan et al. | |
| 9,814,826 B2 | 11/2017 | Hidem et al. | |
| 9,849,899 B1 | 12/2017 | Guirlinger | |
| 9,862,398 B1 | 1/2018 | Guirlinger | |
| 9,937,941 B2 | 4/2018 | Huang et al. | |
| 10,086,508 B2 | 10/2018 | Hoppe et al. | |
| 10,093,335 B2 | 10/2018 | Thuma et al. | |
| 10,118,632 B2 | 11/2018 | Carzola | |
| 10,239,546 B1 | 3/2019 | Scott | |
| D844,324 S | 4/2019 | Hoppe et al. | |
| 10,246,116 B2 | 4/2019 | Oltman et al. | |
| 10,335,537 B2 | 7/2019 | Hidem et al. | |
| 10,356,986 B2 | 7/2019 | Burmann | |
| 10,376,630 B2 | 8/2019 | Hidem et al. | |
| 10,391,625 B2 | 8/2019 | Gang et al. | |
| D862,026 S | 10/2019 | Carzola | |
| 10,427,702 B2 | 10/2019 | Phillips et al. | |
| 10,486,722 B2 | 11/2019 | Alves De Moraes et al. | |
| 10,501,104 B2 | 12/2019 | Simmons et al. | |
| 10,583,962 B2 | 3/2020 | Brunner et al. | |
| 10,703,534 B2 | 7/2020 | Brunner et al. | |
| 10,750,833 B2 | 8/2020 | Burchia | |
| 10,773,374 B2 | 9/2020 | Hoppe et al. | |
| RE48,237 E | 10/2020 | Fodrocy et al. | |
| D911,654 S | 2/2021 | Yu et al. | |
| D911,657 S | 2/2021 | Yu et al. | |
| 10,913,474 B1 | 2/2021 | Chiao et al. | |
| 11,554,800 B2 * | 1/2023 | Su | B62B 5/067 |
| 11,882,929 B2 * | 1/2024 | Blumenthal | B25H 3/022 |
| 11,890,744 B2 * | 2/2024 | Groves | B25H 1/04 |
| 12,233,530 B2 * | 2/2025 | Blumenthal | B25H 1/06 |
| 2002/0008367 A1 * | 1/2002 | Durham | B62B 1/12 |
| | | | 280/47.27 |
| 2002/0030337 A1 | 3/2002 | Calmeise et al. | |
| 2002/0130598 A1 | 9/2002 | Schmidt | |
| 2003/0139080 A1 | 7/2003 | Lafragette et al. | |
| 2003/0184034 A1 | 10/2003 | Pfeiffer | |
| 2004/0227315 A1 | 11/2004 | Van Landingham, Jr. | |
| 2004/0262867 A1 | 12/2004 | Arceta et al. | |
| 2005/0011037 A1 | 1/2005 | Zhao et al. | |
| 2005/0023786 A1 | 2/2005 | Delmerico | |
| 2005/0248109 A1 | 11/2005 | Chang | |
| 2006/0232032 A1 | 10/2006 | Goldberg | |
| 2007/0138041 A1 | 6/2007 | Welsh | |
| 2008/0000171 A1 | 1/2008 | McKay et al. | |
| 2008/0084036 A1 | 4/2008 | Keeler | |
| 2008/0302585 A1 | 12/2008 | Perelli et al. | |
| 2009/0189498 A1 | 7/2009 | Catron et al. | |
| 2009/0230644 A1 | 9/2009 | Stanley | |
| 2009/0319079 A1 | 12/2009 | Arceta et al. | |
| 2010/0066045 A1 | 3/2010 | Presnell et al. | |
| 2010/0283227 A1 | 11/2010 | Perelli et al. | |
| 2011/0260588 A1 | 10/2011 | Lin | |
| 2012/0274196 A1 | 11/2012 | Arceta et al. | |
| 2012/0310031 A1 | 12/2012 | Quirico et al. | |
| 2013/0033014 A1 | 2/2013 | Yang | |
| 2013/0127129 A1 | 5/2013 | Bensman et al. | |
| 2013/0307238 A1 | 11/2013 | Campbell et al. | |
| 2014/0084187 A1 | 3/2014 | Quirico et al. | |
| 2014/0265440 A1 | 9/2014 | Chen et al. | |
| 2014/0343418 A1 | 11/2014 | Quirico et al. | |
| 2015/0097348 A1 | 4/2015 | Steinfels et al. | |
| 2015/0225006 A1 | 8/2015 | Thiel | |
| 2016/0009306 A1 | 1/2016 | Garcia | |
| 2016/0287900 A1 | 10/2016 | Quirico et al. | |
| 2016/0325042 A1 | 11/2016 | Hidem et al. | |
| 2017/0166352 A1 | 6/2017 | Hoppe et al. | |
| 2018/0093035 A1 | 4/2018 | Hidem et al. | |
| 2018/0161975 A1 | 6/2018 | Brunner | |
| 2018/0220758 A1 | 8/2018 | Burchia | |
| 2018/0301233 A1 | 10/2018 | Quirico et al. | |
| 2019/0023298 A1 | 1/2019 | Carzola | |
| 2019/0039637 A1 | 2/2019 | Thuma et al. | |
| 2019/0084602 A1 | 3/2019 | Ribbe et al. | |
| 2019/0225371 A1 | 7/2019 | Hoppe et al. | |
| 2019/0307949 A1 | 10/2019 | Hidem et al. | |
| 2020/0039553 A1 | 2/2020 | Abohammdan et al. | |
| 2020/0147781 A1 | 5/2020 | Squiers et al. | |
| 2020/0165036 A1 | 5/2020 | Squiers et al. | |
| 2020/0223585 A1 | 7/2020 | Brunner et al. | |
| 2020/0299027 A1 | 9/2020 | Brunner et al. | |
| 2020/0346677 A1 | 11/2020 | Yu et al. | |
| 2020/0346819 A1 | 11/2020 | Kogel et al. | |
| 2020/0401133 A1 | 12/2020 | Armbrust et al. | |
| 2020/0406446 A1 | 12/2020 | Hoppe et al. | |
| 2021/0016928 A1 | 1/2021 | Brunner et al. | |

(56)                References Cited

U.S. PATENT DOCUMENTS

| 2021/0031975 | A1  | 2/2021  | Brunner et al. |
| 2021/0300447 | A1* | 9/2021  | Brunner ................. B62B 1/002 |
| 2023/0122425 | A1  | 4/2023  | Camp et al. |

FOREIGN PATENT DOCUMENTS

| EP | 2289671      | 3/2011  |
| EP | 2537641 B1   | 9/2016  |
| EP | 2338650 B1   | 10/2016 |
| GB | 2211486      | 7/1989  |
| WO | WO0144035    | 6/2001  |
| WO | WO05016071   | 2/2005  |
| WO | WO2014/125484 | 8/2014 |
| WO | WO19228647   | 12/2019 |

OTHER PUBLICATIONS

International Search Report and Written Opinion for International Application No. PCT/US2022/077841, dated Feb. 9, 2023, 11 pages.
Inter Partes Review No. 2024-01400, "Petition for Inter Partes Review of U.S. Pat. No. 11,365,026" Filed Sep. 17, 2024, 147 pages.
Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.
Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.

Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.

* cited by examiner

TRANSPORTATION DEVICE FOR MODULAR UNITS

CROSS-REFERENCE TO RELATED PATENT APPLICATIONS

The present application is a continuation of International Application No. PCT/US2022/077841, filed Oct. 10, 2022, which claims the benefit of and priority to U.S. Provisional Application No. 63/280,936, filed on Nov. 18, 2021, and U.S. Provisional Application No. 63/254,792, filed on Oct. 12, 2021, each of which are incorporated herein by reference in its entirety.

BACKGROUND OF THE INVENTION

The present disclosure is directed generally to transportation. The present disclosure relates specifically to a mobile device configured to couple to one or more units within a modular system.

SUMMARY OF THE INVENTION

One embodiment of the invention relates to a mobile support device configured to move and support utility modules. The mobile support device includes a lower housing defining a first surface, a plurality of wheels coupled to the lower housing, an upper housing pivotally coupled to the lower housing such that the upper housing pivots with respect to the lower housing about a first axis, a plurality of female couplers located in the first surface, each of the female couplers are configured for arresting engagement with male couplers of a first utility module, and a plurality of male couplers extending from the second surface, each of the male couplers are configured for arresting engagement with female couplers of the first utility module. The upper housing defines a second surface. The upper housing and the lower housing pivotally actuate with respect to each other between an open configuration and a retracted configuration. The first surface and the second surface face in the same direction when the upper housing is positioned in the open configuration with respect to the lower housing;

Another embodiment of the invention relates to a mobile support device configured to move and support utility modules on a worksite. The mobile support device includes a lower housing comprising a first surface, a plurality of wheels coupled to the lower housing, a foot pivotally coupled to the lower housing such that the foot rotates with respect to the lower housing about a first axis, a first plurality of female couplers located in the first surface, each of the female couplers are configured for arresting engagement with male couplers of a first utility module, and a second plurality of female couplers located in the second surface, each of the female couplers are configured for arresting engagement with the male couplers of the first utility module. The foot actuates between a closed configuration and an open configuration with respect to the lower housing. The foot includes a second surface that faces in the same direction as the first surface when the foot is positioned in the closed configuration with respect to the lower housing.

Another embodiment of the invention relates to a mobile support device configured to move and support utility modules on a worksite. The mobile support device includes a lower housing comprising a first surface, a plurality of wheels coupled to the lower housing, a foot pivotally coupled to the lower housing such that the foot rotates with respect to the lower housing about a first axis, a first plurality of female couplers located in the first surface, each of the female couplers are configured for arresting engagement with male couplers of a first utility module, and a second plurality of female couplers located in the second surface, each of the female couplers are configured for arresting engagement with the male couplers of the first utility module. The foot actuates between a closed configuration and an open configuration with respect to the lower housing. The foot includes a second surface that extends away from the first surface and faces upward when the foot is positioned in the open configuration with respect to the lower housing.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a transportation device are shown. The transportation device is configured to detachably engage with units, such as modular units, to facilitate moving the modular units. The transportation device is also configured to fold into a retracted configuration for easier movement of the transportation device, such as by coupling the transportation device within a modular system that includes utility modules.

The term 'utility module' is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, etc., of any shape and size, and wherein any utility module can be detachably attached to any other utility module. The term 'utility assembly' as used herein denotes any set of utility modules configured for articulation to one another, either as a stationary unit or locomotive.

Figures 1, 2:
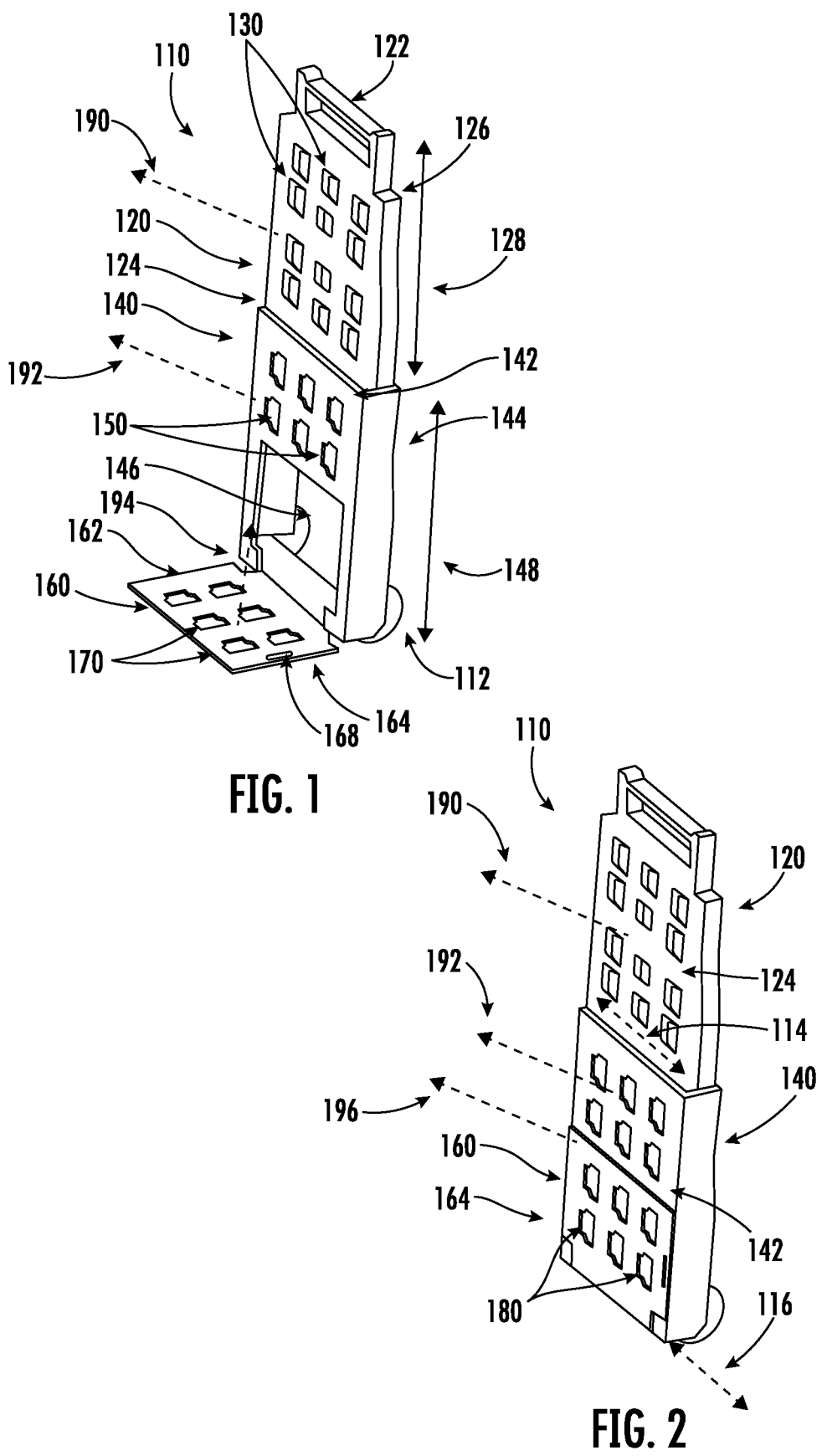
FIG. 1 is a perspective view of a mobile support device, according to an exemplary embodiment.
FIG. 2 is a perspective schematic view of the mobile support device of FIG. 1, according to an exemplary embodiment.
Figure 3:
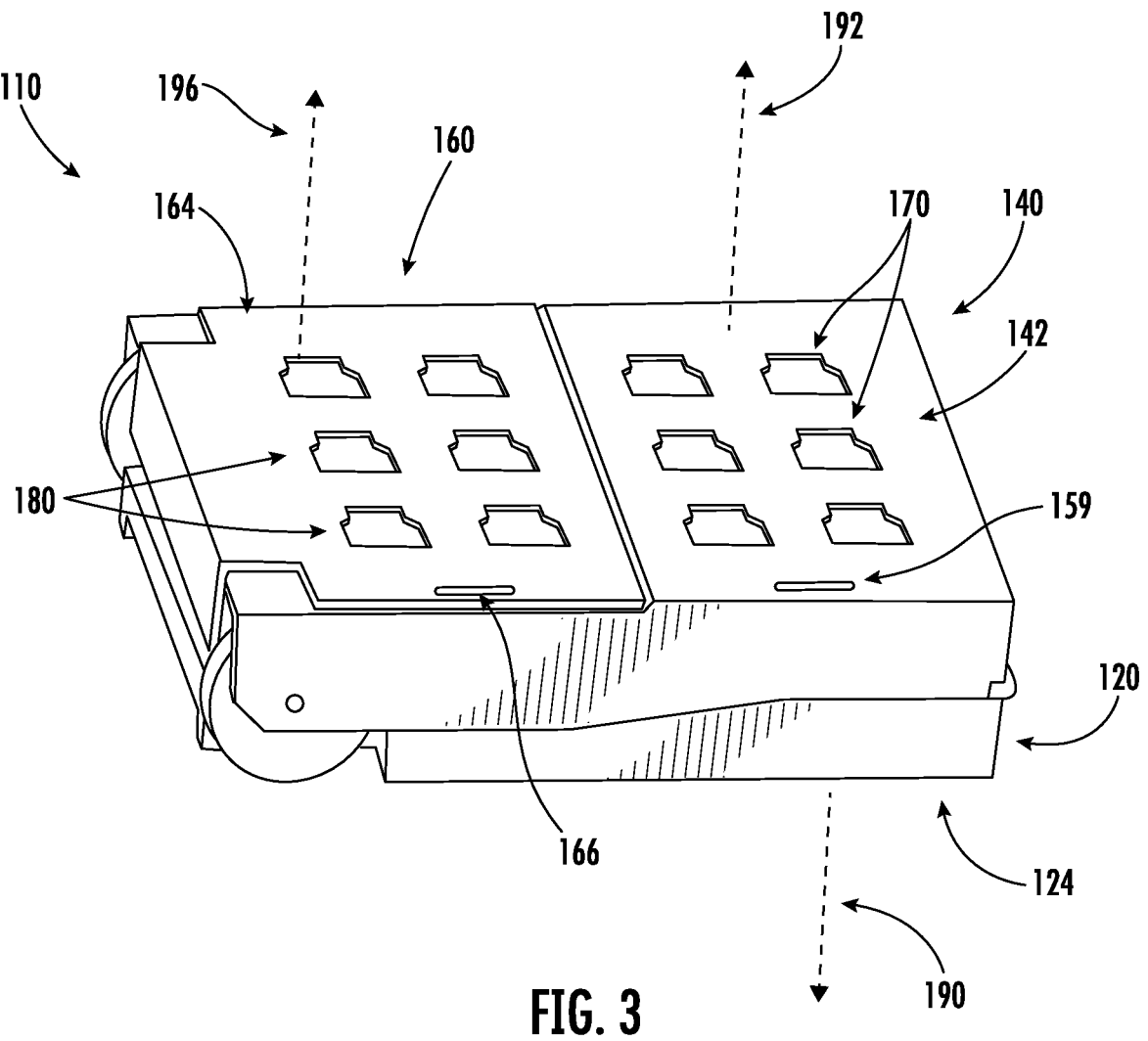
FIG. 3 is a perspective schematic view of the mobile support device of FIG. 1, according to an exemplary embodiment.
Figure 4:
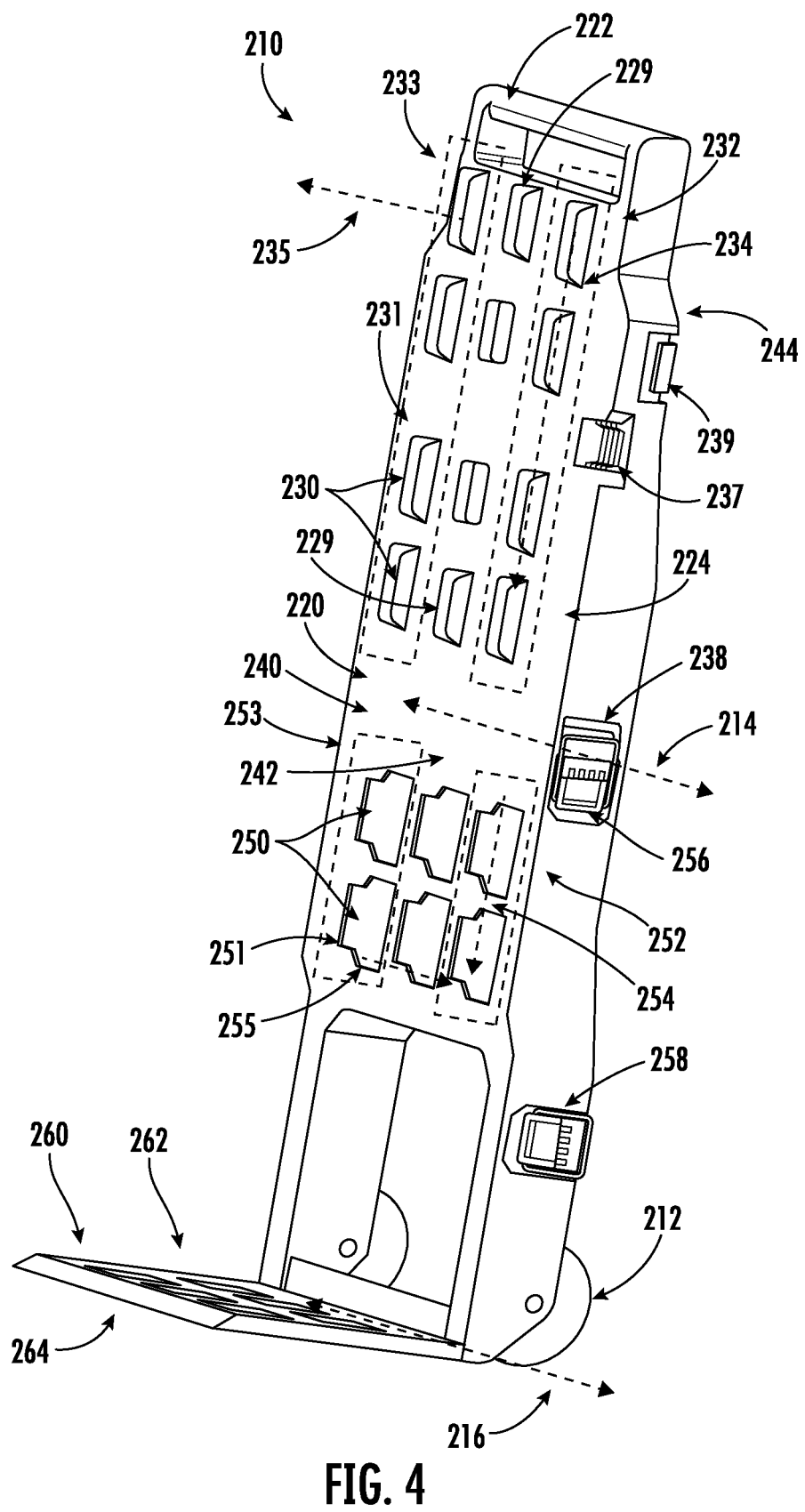
FIG. 4 is a perspective view of a mobile support device, according to an exemplary embodiment.

Referring to FIGS. 1-3, a transportation device, such as a mobile support device, shown as foldable utility cart 110, is shown according to an exemplary embodiment. Foldable utility cart 110 is configured to move and support utility modules. Foldable utility cart 110 includes an upper housing 120, a lower housing 140 pivotally coupled to the upper housing 120, and a foot 160 pivotally coupled to the lower housing 140. Foldable utility cart 110 is configured to move and support utility modules on a worksite. Upper housing 120 rotates with respect to lower housing 140 about axis 114. Foot 160 rotates with respect to lower housing 140 about axis 116. In various embodiments, axis 114 and axis 116 are distinct (e.g., parallel and not aligned).

As will be explained more fully, each of upper housing 120, lower housing 140, and foot 160 includes one or more coupling components. In various embodiments, the coupling components are compatible with the coupling mechanism(s) described in International Patent International Patent Publication No. WO 2017/191628, which is incorporated herein by reference in its entirety.

Figure 12:
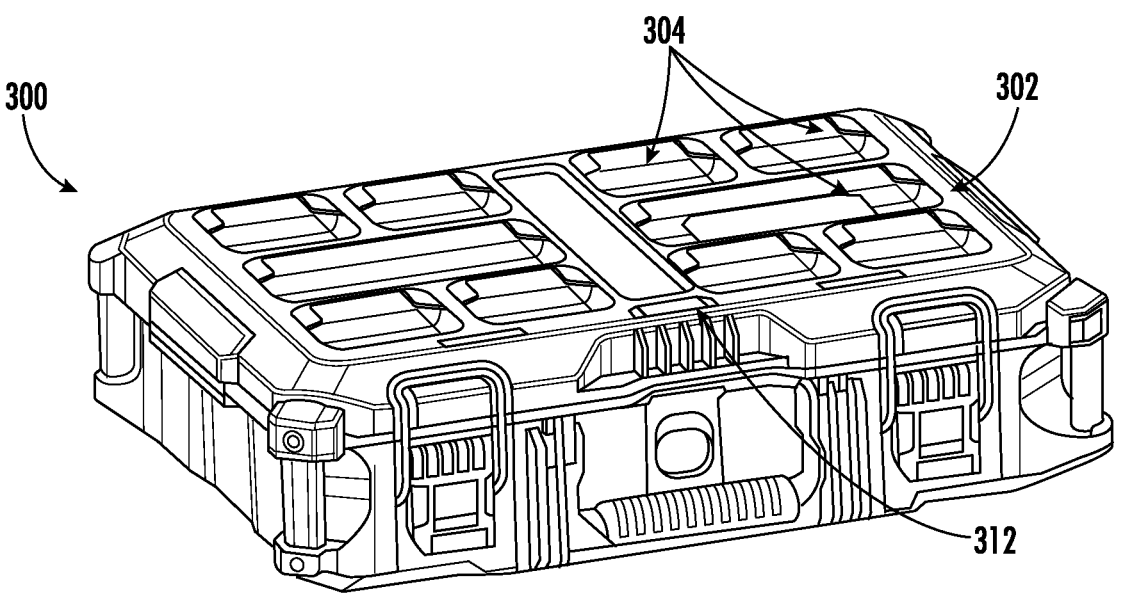
FIG. 12 is a perspective view from above of a utility module, according to an exemplary embodiment.
Figure 13:
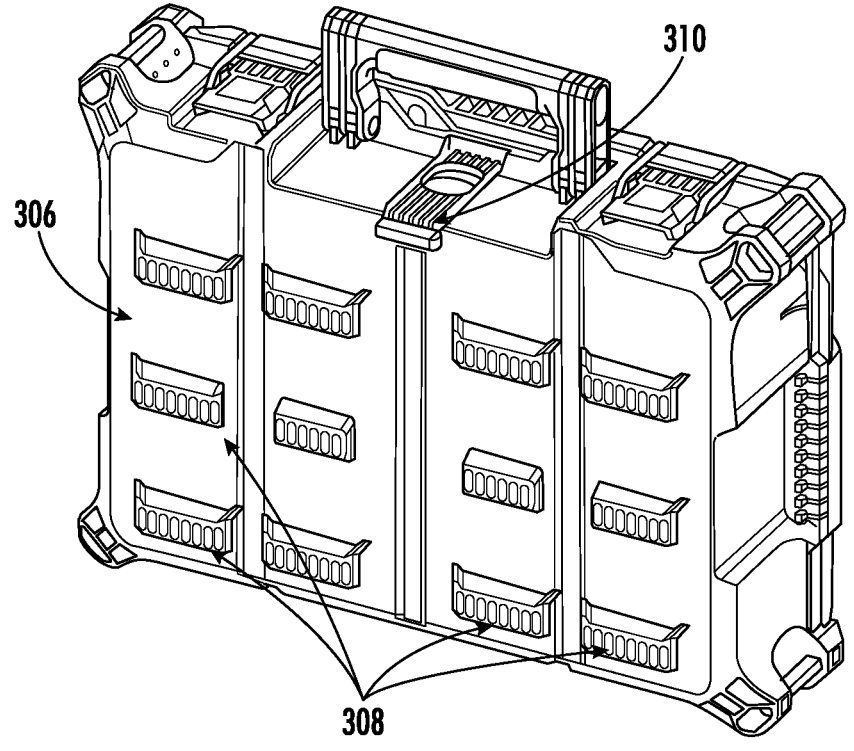
FIG. 13 is a perspective view from below of the utility module of FIG. 12, according to an exemplary embodiment.

Handle 122 extends from upper housing 120, the handle 122 is configured to be grasped while the foldable utility cart 110 is being moved across a ground surface. Upper housing 120 includes a surface 124 and an opposing rear surface 126. In various embodiments surface 124 includes one or more couplers, such as male couplers 130 configured to detachably engage with female couplers (e.g., female couplers of a utility module, such as shown in FIGS. 12-13). In various embodiments, each of male couplers 130 include two ribs that extend along opposing sides of the respective male coupler. The ribs are configured to engage with ledges of female couplers.

Surface 142 of lower housing 140 defines one or more female couplers 150. In various embodiments, each of female couplers 150 includes two ledges that extend along opposing sides of the female couplers 150. The two ledges are configured to engage with two ribs that extend from a male coupler.

Wheels 112 are coupled to foldable utility cart 110, such as to lower housing 140. In use, a user engages with handle 122 to push or pull the foldable utility cart 110 around on the wheels 112.

When foldable utility cart 110 is fully opened (FIG. 1), foot 160 extends laterally away from lower housing 140 thereby exposing upper surface 162 of foot 160, and upper female couplers 170 located in upper surface 162. When foldable utility cart 110 is partially open (FIG. 2), foot 160 is pivoted against lower housing 140 thereby exposing lower surface 164 of foot 160, and lower female couplers 180 located in lower surface 164. In the partially open position, foot 160 covers aperture 146 of lower housing 140. Female couplers 170 of foot 160 are configured to receive and engage with coupling mechanisms. In particular, female couplers 170 include ledges, such as two ledges an opposing sides of the female coupler 170 that are configured to engage with ribs of a corresponding male coupler.

Foldable utility cart 110 actuates from a fully open position (FIG. 1) with foot 160 extended forward from lower housing 140, to a partially open position (FIG. 2) with foot 160 pivoted close against lower housing 140, to a retracted position (FIG. 3) with upper housing 120 and lower housing 140 pivoted towards each other. In the fully open position (FIG. 1), the foot 160 is configured to couple with a half-width modular unit (see International Patent International Patent Publication No. WO 2017/191628). In the partially open position (FIG. 2), the foldable utility cart 110 is configured to couple to and receive a full-width modular unit (see International Patent International Patent Publication No. WO 2017/191628).

When in the fully open position (FIG. 1), surface 124 of upper housing 120 and surface 142 of lower housing 140 face in the same direction. In particular, direction 190 of surface 124 of upper housing 120 is parallel to direction 192 of surface 142 of lower housing 140, and each of direction 190 and direction 192 are perpendicular and/or generally perpendicular (e.g., 80 to 100 degrees, or more specifically 85-95 degrees, or more specifically 89-91 degrees) to direction 194 of upper surface 162 of foot 160.

When in the partially open position (FIG. 2), surface 124 of upper housing 120 and surface 142 of lower housing 140 are facing in the same direction as lower surface 164 of foot 160. In particular, direction 190 of surface 124 of upper housing 120 is parallel to direction 192 of surface 142 of lower housing 140, and both direction 190 and direction 192 are parallel to direction 196 of lower surface 164 of foot 160.

When in the retracted position (FIG. 3), surface 124 of upper housing 120 faces away from one or more of (e.g., each of) surface 142 of lower housing 140 and lower surface 164 of foot 160. In particular, direction 196 of lower surface 164 of foot 160 is parallel to direction 192 of front surface 142 of lower housing 140, and both direction 196 and direction 192 extend directly away from and parallel to direction 190 of front surface 124 of upper housing 120.

In the retracted position, foldable utility cart 110 is configured to be moved and coupled within a modular system. For example, the foldable utility cart 110 may be coupled to an upper surface of a modular unit (e.g., upper surface 302 of utility module 300; see FIG. 12), such as by male couplers 130 of upper housing 120 (FIG. 3) engaging with female couplers on the upper surface of the modular unit. The foldable utility cart 110 may further be coupled to a lower surface of a second modular unit (e.g., lower surface 306 of utility module 300; see FIG. 13), such as by female couplers 130 and/or female couplers 150 engaging with male couplers on the lower surface of the second modular unit. Thus, foldable utility cart 110 may be incorporated within a stack of modular units.

In various embodiments lower housing 140 defines a rear cavity 144 configured to receive upper housing 120 when foldable utility cart 110 is arranged in the retracted position. As will be observed, height 148 of lower housing 140 and height 128 of upper housing 120 are approximately the same (e.g., within 10% of each other), reducing the footprint of foldable utility cart 110 when arranged in the retracted position (FIG. 3).

Referring to FIG. 3, latch recess 159 receives a latch of a utility module to prevent sliding disengagement of the utility module coupled to lower housing 140. Similarly, latch recess 166 receives a latch to prevent sliding disengagement of utility module coupled to foot 160.

Referring to FIGS. 4-9, various aspects of foldable utility cart 210 are shown. embodiment. Foldable utility cart 210 is substantially the same as foldable utility cart 110 except for the differences discussed herein. Foldable utility cart 210 is configured to move and support utility modules.

Foldable utility cart 210 includes lower housing 240, a plurality of wheels 212 coupled to the lower housing 240, upper housing 220 pivotally coupled to lower housing 240 such that the upper housing 220 pivots with respect to the lower housing 240 about a first axis 214. Handle 222 extends from upper housing 220, and the handle 222 is configured to be grasped while the foldable utility cart 210 is being moved across a ground surface.

The upper housing 220 and the lower housing 240 pivotally actuate with respect to each other between an open configuration and a retracted configuration. Surface 224 of upper housing 220 faces in direction 225 (e.g., direction 225 is normal to surface 224), and surface 242 of lower housing 240 faces in direction 243 (e.g., direction 243 is normal to surface 242), and direction 225 and direction 243 face in the same direction and are parallel when the upper housing 220 is positioned in the open configuration with respect to the lower housing 240, and direction 225 and direction 243 are parallel and face away from each other when the upper housing 220 and the lower housing 240 are positioned in the retracted configuration. Stated another way, surface 224 of upper housing 220 and surface 242 of lower housing 240 face in the same direction and are parallel to each other when the upper housing 220 is positioned in the open configuration with respect to the lower housing 240, and surface 224 of upper housing 220 and surface 242 of lower housing 240 face away from each other and parallel to each other when the upper housing 220 is positioned in the retracted configuration with respect to the lower housing 240.

In various embodiments, surface 224 of upper housing 220 and surface 242 of lower housing 240 are coplanar when the upper housing 220 is positioned in the open configuration with respect to the lower housing 240, and surface 224 of upper housing 220 and surface 242 of lower housing 240 face away from each other when the upper housing 220 and the lower housing 240 are positioned in the retracted configuration. The upper housing 220 defines a surface 224 from which the plurality of male couplers 230 extend, each of the male couplers 230 is configured for arresting engagement with female couplers of a first utility module. The lower housing 240 includes a surface 242 that defines the plurality of female couplers 250, each of the female couplers 250 is configured for arresting engagement with male couplers of the first utility module. In various embodiments, when the upper housing 220 and the lower housing 240 are in the open configuration, the surface 224 and the surface 242 are coplanar with each other. In various embodiments, when the upper housing 220 and the lower housing 240 are in the retracted configuration the surface 224 and the surface 242 are facing away from each other.

In various embodiments, to secure lower housing 220 and upper housing 240 in the open configuration, a latch is coupled to one of lower housing 220 and upper housing 240, and the other includes a latch recess that engages with the latch. As shown, when the upper housing 220 and the lower housing 240 are in the open configuration, latch 256 is coupled to lower housing 240 and latch 256 engages with latch recess 238 in upper housing 220, thereby spanning between upper housing 220 and lower housing 240 (e.g., spanning hinge 218), to secure upper housing 220 and lower housing 240 together. In various embodiments, upper housing 220 is pivotally coupled to lower housing 240 via hinge 240.

Similarly, in various embodiments to secure lower housing 220 and upper housing 240 in the retracted configuration one of lower housing 220 and upper housing 240 includes a latch, and the other includes a latch recess that engages with the latch. As shown, when the upper housing 220 and the lower housing 240 are in the retracted configuration, latch 258 and latch recess 239 engage to secure upper housing 220 and lower housing 240 together.

When lower housing 220 and upper housing 240 are in the retracted configuration, latch 237 interfaces with a corresponding coupling structure, such as a latch recess in a utility module, to secure upper housing 240 with the utility module.

A plurality of male couplers 230 extend from surface 224 of upper housing 220. As will be explained, the male couplers 230 couple with female couplers, such as on utility modules. In various embodiments, the plurality of male couplers 230 include a front row 232 of at least two male couplers 230 aligned with each other in a first direction 234 and a rear row 233 of at least two male couplers 230 aligned with each other in the first direction 234, the front row 232 and the rear row 233 between the handle 222 and the wheels 212. A plurality of male couplers 229 with a single tongue 231 also extend from surface 224 of upper housing 220.

A plurality of female couplers 250 are located in the lower housing 240. The plurality of female couplers 250 include a front row 252 of at least two female couplers 250 aligned with each other in a third direction 254 and a rear row 253 of at least two female couplers 250 aligned with each other in the third direction 254, the front row 252 and the rear row 253 between the handle 222 and the wheels 212. In various embodiments the third direction 254 is parallel to the first direction 234. In various embodiments, multiple rows of male couplers are above multiple rows of female couplers when the foldable utility module 210 is in the open configuration (see FIG. 4) or partially open configuration.

In various embodiments, male couplers 230 engage with corresponding female couplers via the female couplers sliding in a direction opposite direction 235, and female couplers 250 engage with corresponding male couplers via the male couplers sliding in a direction opposite direction 255. In various embodiments, the direction to engage female couplers 250 (e.g., opposite direction 255) and/or the direction to engage male couplers 230 (e.g., opposite direction 235) is perpendicular to the height of foldable utility cart 210 (e.g., perpendicular to the longitudinal axis of foldable utility cart 210). In various embodiments, the direction to engage female couplers 250 (e.g., opposite direction 255) and/or the direction to engage male couplers 230 (e.g., opposite direction 235) are parallel to each other.

In various embodiments, the direction to engage female couplers 250 (e.g., opposite direction 255) and/or the direction to engage male couplers 230 (e.g., opposite direction 235) are parallel to axis 214 that upper housing 220 pivots with respect to lower housing 240, and the direction to engage female couplers 250 (e.g., opposite direction 255) and/or the direction to engage male couplers 230 (e.g., opposite direction 235) are parallel to a rotational axis that wheels 212 rotate when a user is rolling foldable utility cart 210. In various embodiments, the direction to engage female couplers 250 (e.g., opposite direction 255) and/or the direction to engage male couplers 230 (e.g., opposite direction 235) are parallel and opposite with respect to each other.

Foot 260 is pivotally coupled to the lower housing 240 such that the foot 260 rotates with respect to the lower housing 240 about a second axis 216, foot 260 actuating between a closed configuration and an open configuration with respect to the lower housing 240. In various embodiments, second axis 216 is parallel to the first axis 214. In various embodiments, foot 260 is a single plate, such as a single thin plate. In various embodiments, foot 260 is a single plate with protrusions and/or recesses to form the couplers 270 and/or couplers 280. In various embodiments, foot 260 does not include a storage compartment configured to storage objects. In various embodiments, foot 260 includes two plates coupled closely together, and the two plates do not form a storage compartment between the two plates.

Foot 260 defines surface 262 and surface 264, which face away from each other. Surface 262 faces in direction 263 (e.g., direction 263 is normal to surface 262), and surface 264 faces in direction 265 (e.g., direction 265 is normal to surface 264). In various embodiments surface 264 is coplanar and/or parallel to surface 242 of lower housing 240 when foot 260 is positioned in the closed configuration with respect to lower housing 240. In various embodiments, surface 262 is perpendicular and/or nearly perpendicular to surface 242 of lower housing 240 and surface 262 is facing upward when foot 260 is positioned in the open configuration with respect to the lower housing 240. Stated another way, foot 260 includes surface 262 that extends away from surface 242 of lower housing 240 and faces upward when the foot 260 is positioned in the open configuration with respect to the lower housing 240. In various embodiments, foot 260 includes surface 264 that faces in the same direction 265 as the surface 242 of lower housing 240 when the foot 260 is positioned in the closed configuration with respect to the lower housing 240.

Figure 5:
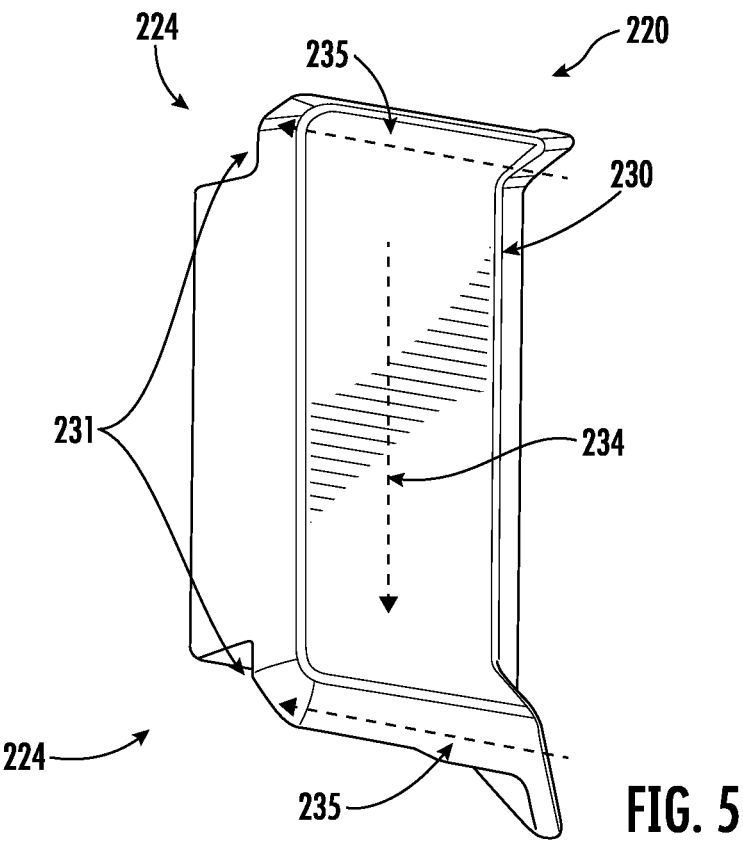
FIG. 5 is a perspective view of a first male coupler of the mobile support device of FIG. 4, according to an exemplary embodiment.

Referring to FIG. 5, in various embodiments each of the male couplers 230 include two tongues 231 on opposing sides of the respective male coupler 230. Each of the two tongues 231 are offset from the front surface 224 of the upper housing 220 and extend in a second direction 235 perpendicular to the first direction 234, each of the tongues 231 extending in direction 235 from a closed back end 227 towards an open front end 228. Each of the male couplers 230 are configured for arresting engagement with female couplers of a first utility module, such as a tool storage utility module configured to store tools and equipment.

Figure 6:
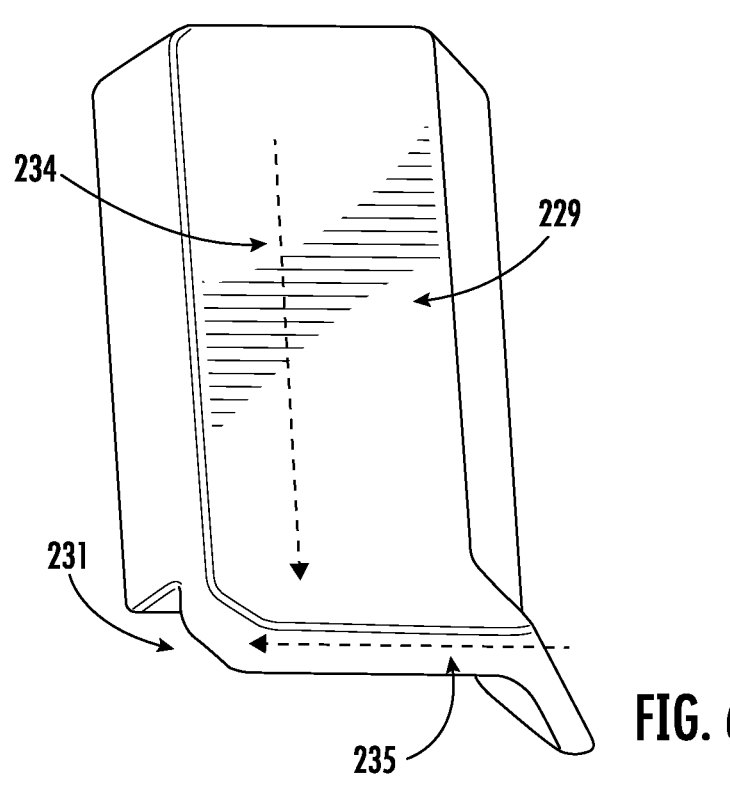
FIG. 6 is a perspective view of a second male coupler of the mobile support device of FIG. 4, according to an exemplary embodiment.

Referring to FIG. 6, in various embodiments each of the male couplers 229 include one tongue 231 on a single side of the respective male coupler 229. The tongue 231 is offset from the front surface 224 of the upper housing 220 and extends in a second direction 235 perpendicular to the first direction 234. Each of the male couplers 229 are configured for arresting engagement with female couplers of a first utility module, such as a modular utility module configured to store tools and equipment.

Figure 7:
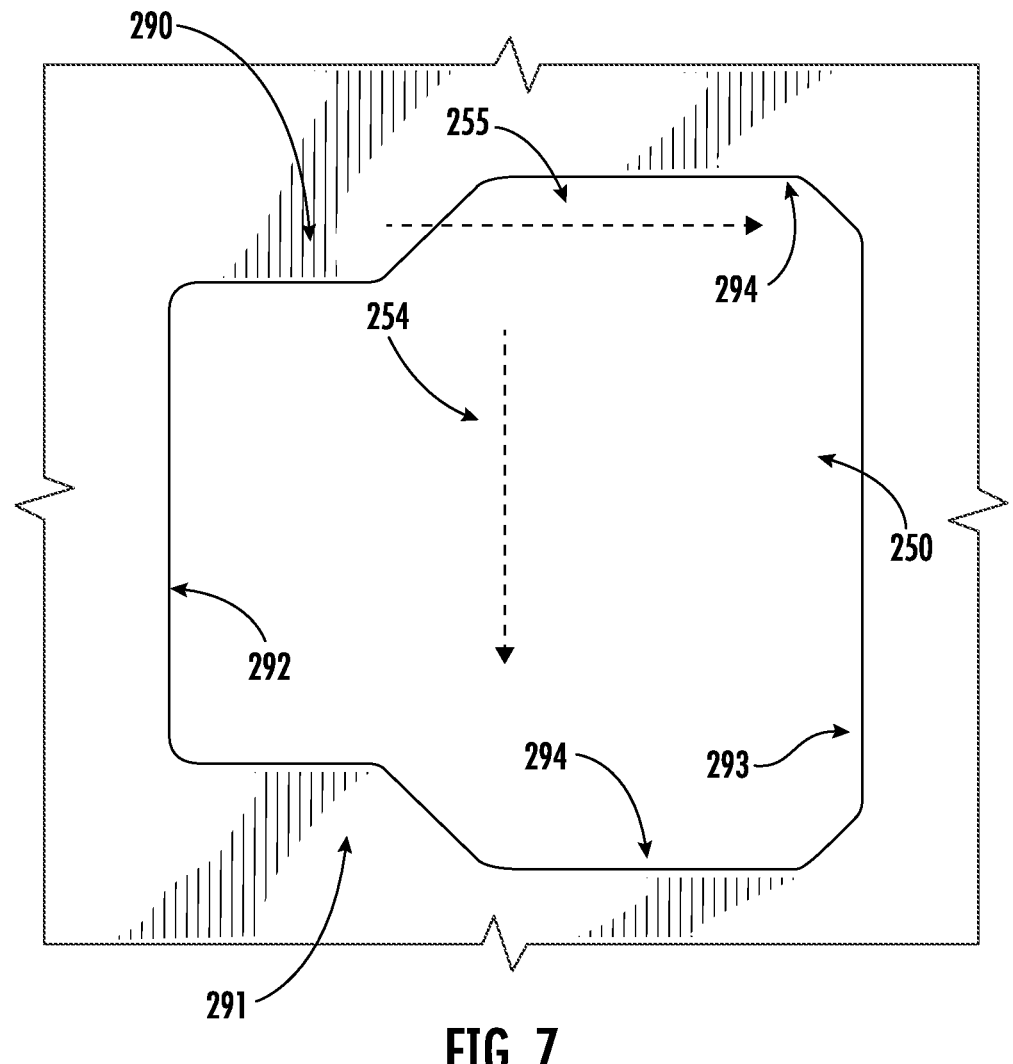
FIG. 7 is a front view of a female coupler of the mobile support device of FIG. 4, according to an exemplary embodiment.
Figure 8:
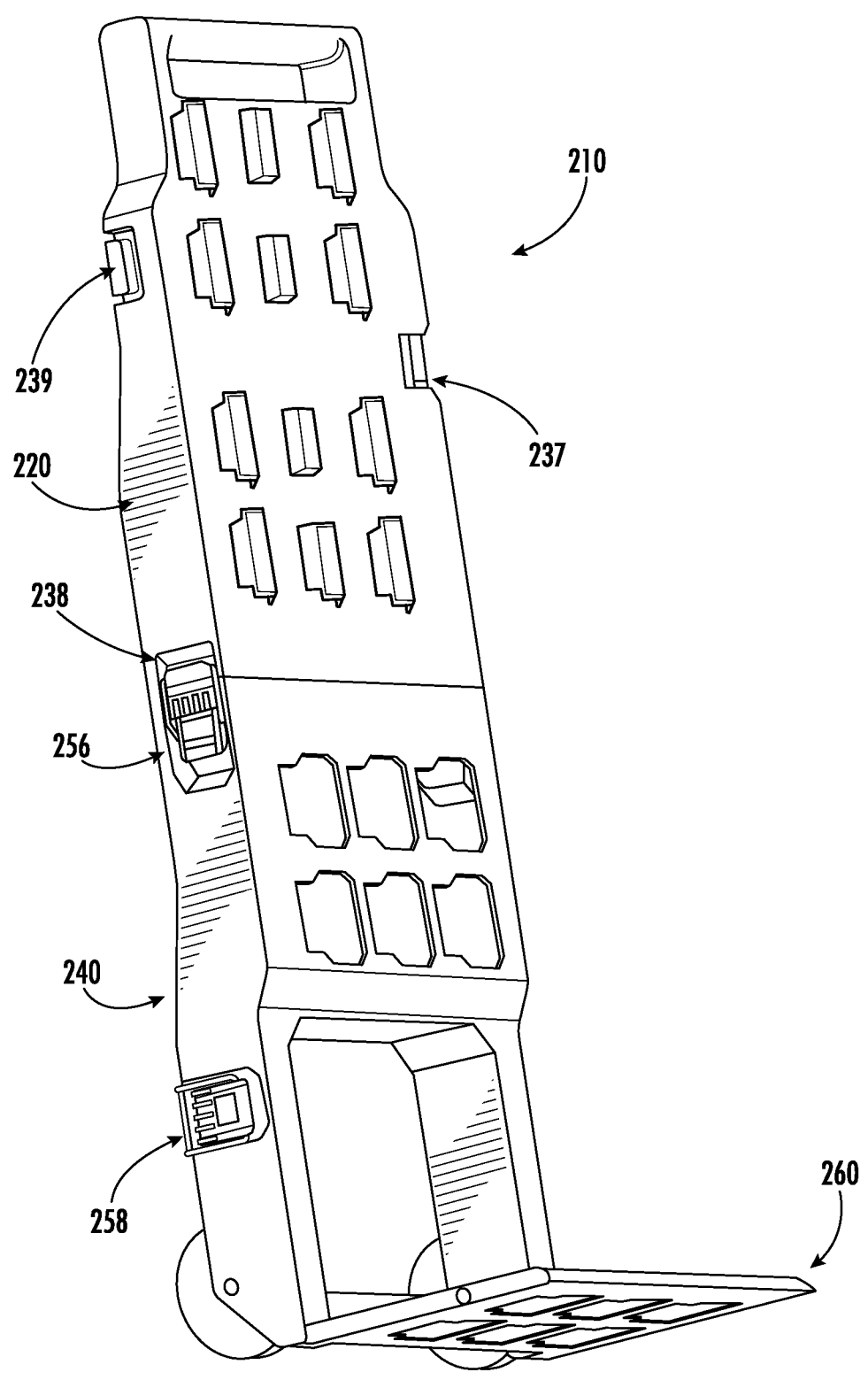
FIG. 8 is a perspective view of the mobile support device of FIG. 4, according to an exemplary embodiment.
Figure 9:
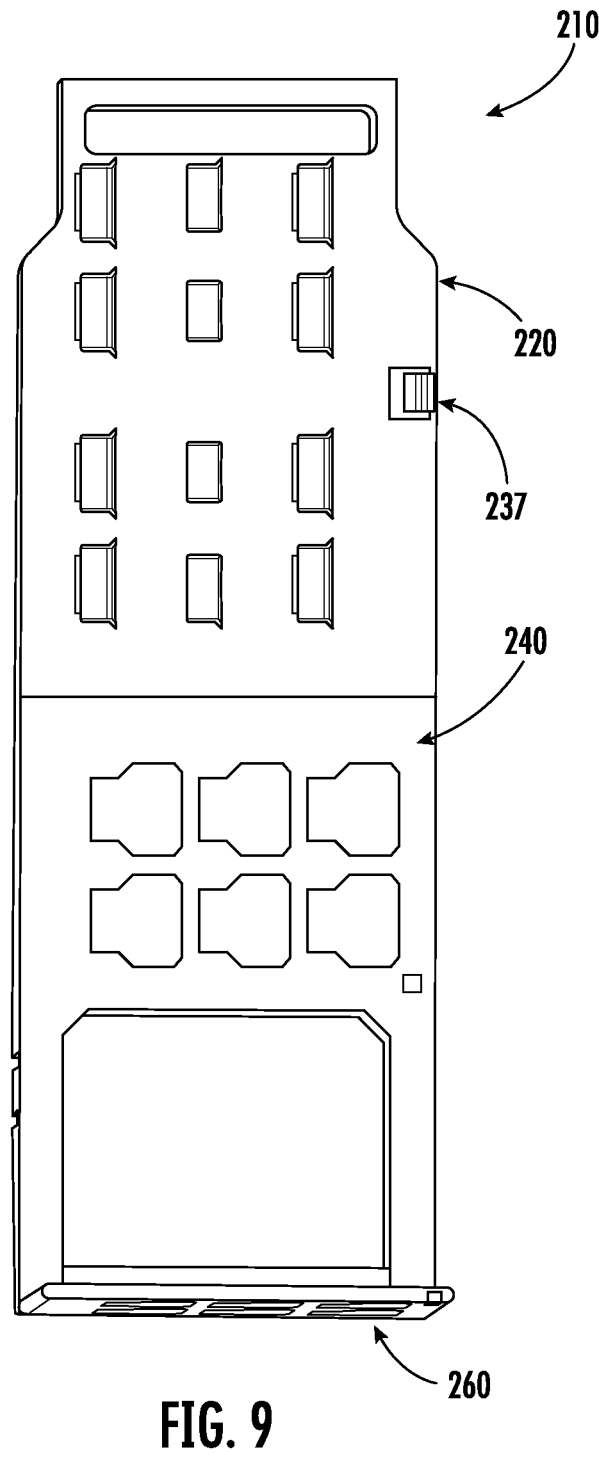
FIG. 9 is a front view of the mobile support device of FIG. 4, according to an exemplary embodiment.

Referring to FIG. 7, each of the female couplers 250 include a first rib 290 and a second rib 291. Each of the first and second ribs 290, 291 extend from a rear wall 292 of the respective female coupler 250 to a front wall 293 of the respective female coupler 250 in a second direction 255, and each of the first ribs 290 extending from a sidewall 294 of the respective female coupler 250 towards the second rib 291 of the respective female coupler 250 and each of the second ribs 291 extending from a sidewall 294 of the respective female coupler 250 towards the first rib 290 of the respective female coupler 250. The sidewalls 294 of female coupler 250 each extend from front wall 293 to rear wall

292. Each of the female couplers 250 are configured for arresting engagement with male couplers of the first utility module, such as by coupling to the opposite side of the first utility module that the male couplers 230 couple to.

In various embodiments, female couplers 150, female couplers 170, female couplers 180, female couplers 270, and female couplers 270 are functionally and/or structurally the same or similar to female couplers 250 of lower housing 240. For example, female couplers 150, female couplers 170, female couplers 180, female couplers 270, and female couplers 270 are arranged in rows similar to female couplers 250, and ribs of the female couplers extend in a direction perpendicular to the rows.

Figure 10:
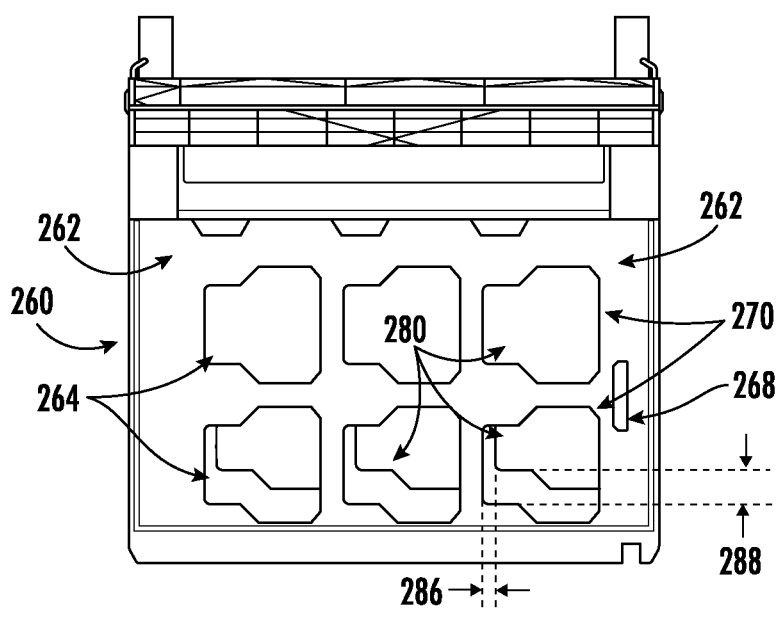
FIG. 10 is a top view of the mobile support device of FIG. 4, according to an exemplary embodiment.
Figure 11:
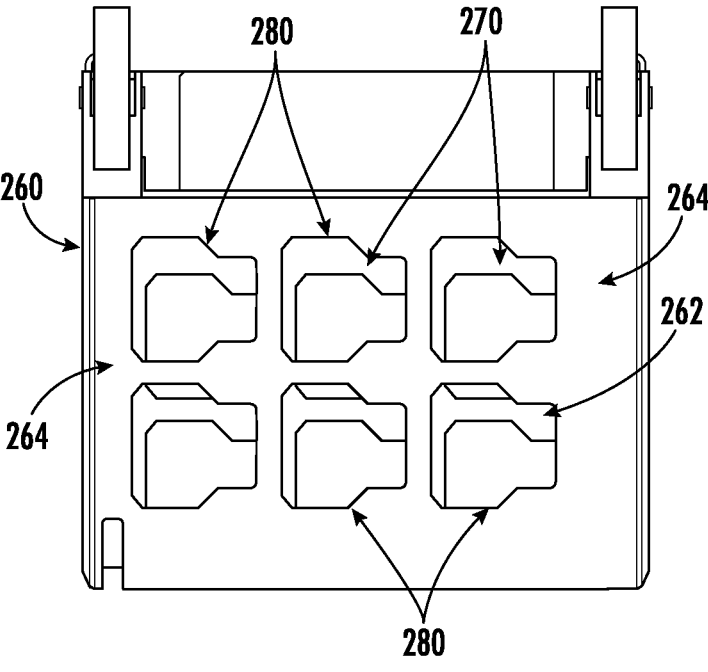
FIG. 11 is a bottom view of the mobile support device of FIG. 4, according to an exemplary embodiment.

Referring to FIGS. 10-11, various aspects of foot 260 are shown. In particular, foot 260 includes one or more sets of female couplers, such as two sets of female couplers on opposing surfaces of foot 160. Surface 262 of foot 260 defines one or more female couplers 270. As shown, surface 262 defines six female couplers 270. Surface 262 also defines a latch recess 268, configured to interface with a latch to prevent sliding disengagement between female couplers 270 and male couplers on a corresponding object, e.g., a utility module coupled to foot 160.

Surface 264 of foot 260 defines one or more female couplers 280. As shown, surface 264 defines six female couplers 280. In various embodiments, female couplers 280 of surface 264 are structurally and/or functionally the same or similar to female couplers 250 of lower housing 240 except as described herein. In particular, female couplers 280 are arranged in rows similar to female couplers 250, and ribs of female couplers 280 extend in a direction perpendicular to the rows.

As can be seen in FIG. 10, female couplers 270 of surface 262 are offset from female couplers 280 of surface 264. In particular, in various embodiments each of female couplers 270 are vertically offset from female couplers 280 by distance 288, and each of female couplers 270 are horizontally offset from female couplers 280 by distance 286.

In various embodiments, female couplers 250, female couplers 270, and female couplers 280 are configured to engage with male couplers of a utility module, and male couplers 230 are configured to engage with female couplers of the same utility module.

Referring to FIGS. 12-13, various aspects of utility module 300 are shown, according to an exemplary embodiment. Utility module 300 includes an upper surface 302 and an opposing lower surface 306 facing away from the upper surface 302. One or more female couplers 304 extend from and/or are located in upper surface 302 of utility module 300, and one or more male couplers 208 extend from lower surface 306 of utility module 300. Utility module 300 includes a latch 310 and a latch recess 312 configured to interface with latch recesses and latches, respectively, to secure utility module 300 to other objects.

Female couplers 304 of utility module 300 detachably engage with one or more of male couplers 130, male couplers 229, and male couplers 230. Similarly, male couplers 208 detachably engage with one or more of female couplers 150, female couplers 170, female couplers 180, female couplers 250, female couplers 270, and/or female couplers 280.

Latch 310 detachably interfaces with one or more of latch recess 159 and/or latch recess 166. When utility module 300 is coupled to lower housing 140 and latch 310 is interfacing within latch recess 159, male couplers 308 of utility module 300 are prevented from slidably disengaging with female couplers 150 of lower housing 140.

When utility module 300 is coupled to foot 160 and latch 310 is interfacing within latch recess 166, male couplers 308 of utility module 300 are prevented from slidably disengaging with female couplers 180 of foot 160. Similarly, when utility module 300 is coupled to foot 160 and latch 310 is interfacing within latch recess 168, male couplers 308 of utility module 300 are prevented from slidably disengaging with female couplers 170 of foot 160.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A mobile support device configured to move and support utility modules, the mobile support device comprising:

a lower housing defining a first surface and a rear cavity;

a plurality of wheels coupled to the lower housing;

an upper housing pivotally coupled to the lower housing such that the upper housing pivots with respect to the lower housing about a first axis, the upper housing defining a second surface, the upper housing and the lower housing pivotally actuating with respect to each other between an open configuration and a retracted configuration, wherein the first surface and the second surface face in the same direction when the upper housing is positioned in the open configuration with respect to the lower housing, and wherein the rear cavity is configured to receive the upper housing in the retracted configuration;

a foot pivotally coupled to the lower housing such that the foot rotates with respect to the lower housing about a second axis, the foot actuating between a closed configuration and an open configuration with respect to the lower housing, the foot comprising a third surface that faces in the same direction as the first surface when the foot is positioned in the closed configuration with respect to the lower housing;

a plurality of female couplers located in the first surface, each of the female couplers are configured for arresting engagement with male couplers of a first utility module; and a plurality of male couplers extending from the second surface, each of the male couplers are configured for arresting engagement with female couplers of the first utility module.

2. The mobile support device of claim 1, each of the female couplers of the plurality of female couplers comprising a first rib and a second rib, each of the first and second ribs extending from a rear wall of the respective female coupler to a front wall of the respective female coupler, each of the first ribs extending from a sidewall of the respective female coupler towards the second rib of the respective female coupler and each of the second ribs extending from a sidewall of the respective female coupler towards the first rib of the respective female coupler.

3. The mobile support device of claim 2, the plurality of female couplers comprising a front row of at least two female couplers aligned with each other in a first direction, and a rear row of at least two female couplers aligned with each other in the first direction.

4. The mobile support device of claim 1, each of the male couplers comprising two tongues on opposing sides of the respective male coupler, each of the two tongues are offset from the second surface and extend in a first direction.

5. The mobile support device of claim 1, wherein the first surface and the second surface face away from each other when the upper housing and the lower housing are positioned in the retracted configuration.

6. The mobile support device of claim 1, comprising a second plurality of female couplers located in the foot, each of the female couplers are configured for arresting engagement with the male couplers of the first utility module.

7. The mobile support device of claim 6, each of the female couplers of the second plurality of female couplers comprising a first rib and a second rib, each of the first and second ribs extending from a rear wall of the respective female coupler to a front wall of the respective female coupler, each of the first ribs extending from a sidewall of the respective female coupler towards the second rib of the respective female coupler and each of the second ribs extending from a sidewall of the respective female coupler towards the first rib of the respective female coupler.

8. The mobile support device of claim 7, the foot comprising a fourth surface facing away from the third surface, the fourth surface defining the second plurality of female couplers.

9. The mobile support device of claim 8, wherein the fourth surface extends away from the first surface and faces upward when the foot is positioned in the open configuration with respect to the lower housing.

10. The mobile support device of claim 1, comprising a handle extending from the upper housing, the handle configured to be grasped while the mobile support device is being moved across a ground surface.

11. A mobile support device configured to move and support utility modules, the mobile support device comprising:

a lower housing comprising a first surface and an aperture defined in the first surface;

a plurality of wheels coupled to the lower housing;

a foot pivotally coupled to the lower housing such that the foot rotates with respect to the lower housing about a first axis, the foot actuating between a closed configuration and an open configuration with respect to the lower housing, the foot comprising a second surface that faces in the same direction as the first surface and covers the aperture when the foot is positioned in the closed configuration with respect to the lower housing;

a first plurality of female couplers located in the first surface, each of the female couplers are configured for arresting engagement with male couplers of a first utility module; and a second plurality of female couplers located in the second surface, each of the female couplers are configured for arresting engagement with the male couplers of the first utility module.

12. The mobile support device of claim 11, each of the female couplers of the first plurality of female couplers comprising a first rib and a second rib, each of the first and second ribs extending from a rear wall of the respective female coupler to a front wall of the respective female coupler, each of the first ribs extending from a sidewall of the respective female coupler towards the second rib of the respective female coupler and each of the second ribs extending from a sidewall of the respective female coupler towards the first rib of the respective female coupler.

13. The mobile support device of claim 11, each of the female couplers of the second plurality of female couplers comprising a first rib and a second rib, each of the first and second ribs extending from a rear wall of the respective female coupler to a front wall of the respective female coupler, each of the first ribs extending from a sidewall of the respective female coupler towards the second rib of the respective female coupler and each of the second ribs extending from a sidewall of the respective female coupler towards the first rib of the respective female coupler.

14. The mobile support device of claim 11, comprising:

an upper housing pivotally coupled to the lower housing such that the upper housing pivots with respect to the lower housing about a second axis, the upper housing defining a third surface, the upper housing and the lower housing pivotally actuating with respect to each other between an open configuration and a retracted configuration, the upper housing including a plurality of couplers; and a handle extending from the upper housing, the handle configured to be grasped while the mobile support device is being moved across a ground surface.

15. The mobile support device of claim 14, comprising a plurality of male couplers extending from the third surface.

16. A mobile support device configured to move and support utility modules, the mobile support device comprising:

a lower housing comprising a first surface and an aperture defined in the first surface;

a plurality of wheels coupled to the lower housing;

a foot pivotally coupled to the lower housing such that the foot rotates with respect to the lower housing about a first axis, the foot actuating between a closed configuration and an open configuration with respect to the lower housing, the foot comprising:

a second surface that extends away from the first surface and faces upward when the foot is positioned in the open configuration with respect to the lower housing; and a third surface facing away from the second surface and wherein the third surface faces in the same direction as the first surface when the foot covers the aperture in the closed configuration;

a first plurality of female couplers located in the first surface, each of the female couplers are configured for arresting engagement with male couplers of a first utility module; and a second plurality of female couplers located in the second surface, each of the female couplers are configured for arresting engagement with the male couplers of the first utility module.

17. The mobile support device of claim 16, comprising:

an upper housing pivotally coupled to the lower housing such that the upper housing pivots with respect to the lower housing about a second axis, the upper housing defining a second surface, the upper housing and the lower housing pivotally actuating with respect to each other between an open configuration and a retracted configuration, the upper housing including a plurality of male couplers; and a handle extending from the upper housing, the handle configured to be grasped while the mobile support device is being moved across a ground surface.

18. The mobile support device of claim 16, each of female couplers of the first plurality of the female couplers comprising a first rib and a second rib, each of the first and second ribs extending from a rear wall of the respective female coupler to a front wall of the respective female coupler, each of the first ribs extending from a sidewall of the respective female coupler towards the second rib of the respective female coupler and each of the second ribs extending from a sidewall of the respective female coupler towards the first rib of the respective female coupler.

19. The mobile support device of claim 16, each of the female couplers of the second plurality of female couplers comprising a first rib and a second rib, each of the first and second ribs extending from a rear wall of the respective female coupler to a front wall of the respective female coupler, each of the first ribs extending from a sidewall of the respective female coupler towards the second rib of the respective female coupler and each of the second ribs extending from a sidewall of the respective female coupler towards the first rib of the respective female coupler.

\*　\*　\*　\*　\*